(12) United States Patent
Soler

(10) Patent No.: US 8,934,011 B1
(45) Date of Patent: Jan. 13, 2015

(54) VEHICLE RESERVE SECURITY SYSTEM

(76) Inventor: Vidal Soler, Miami, FL (US)

( * ) Notice: Subject to any disclaimer, the term of this patent is extended or adjusted under 35 U.S.C. 154(b) by 1435 days.

(21) Appl. No.: 11/340,984

(22) Filed: Jan. 27, 2006

Related U.S. Application Data

(60) Provisional application No. 60/647,998, filed on Jan. 28, 2005.

(51) Int. Cl.
 *H04N 7/18* (2006.01)
(52) U.S. Cl.
 CPC .................................... *H04N 7/181* (2013.01)
 USPC ........................................... 348/143; 348/148
(58) Field of Classification Search
 CPC ........................... H04N 7/181; G08B 13/19663
 USPC .............. 348/36, 47, 48, 120, 143, 148, 153, 348/211.12, 118, 159
 See application file for complete search history.

(56) References Cited

U.S. PATENT DOCUMENTS

| | | | |
|---|---|---|---|
| 5,027,104 A | 6/1991 | Reid | |
| 5,102,186 A | 4/1992 | Nakagami et al. | |
| 5,680,123 A | 10/1997 | Lee | |
| 5,793,420 A | 8/1998 | Schmidt | |
| 5,978,017 A | 11/1999 | Tino | |
| 6,002,326 A | 12/1999 | Turner | |
| 6,014,163 A * | 1/2000 | Houskeeper | 348/47 |
| 6,151,065 A | 11/2000 | Steed et al. | |
| 6,211,907 B1 | 4/2001 | Scaman et al. | |
| 6,333,759 B1 | 12/2001 | Mazzilli | |
| 6,795,111 B1 * | 9/2004 | Mazzilli | 348/148 |
| 7,697,028 B1 * | 4/2010 | Johnson | 348/148 |
| 2002/0130953 A1 * | 9/2002 | Riconda et al. | 348/115 |
| 2002/0171738 A1 | 11/2002 | Guan | |
| 2003/0041329 A1 * | 2/2003 | Bassett | 725/105 |
| 2003/0081127 A1 * | 5/2003 | Kirmuss | 348/207.99 |
| 2004/0145457 A1 * | 7/2004 | Schofield et al. | 340/425.5 |
| 2005/0030379 A1 * | 2/2005 | Luskin et al. | 348/148 |
| 2006/0139488 A1 * | 6/2006 | Suzuki et al. | 348/513 |

FOREIGN PATENT DOCUMENTS

JP 11298853 A * 10/1999 ............. H04N 5/915

* cited by examiner

*Primary Examiner* — Mekonnen Dagnew
(74) *Attorney, Agent, or Firm* — H. John Rizvi; Gold & Rizvi P.A.

(57) ABSTRACT

A vehicle reserve security system includes a plurality of cameras, a digital video recorder and a video server. A front view camera views an area in front of a vehicle. A front left side camera views an area behind the vehicle and to a left thereof. A front right side camera views an area behind the vehicle and to a right thereof. A rear left side camera views an area in front of the vehicle and to a left thereof. A rear right side camera views an area in front of the vehicle and to a right thereof. A rear view camera views an area to a rear of the vehicle. The output of the plurality of cameras is input by the digital video recorder. The digital video recorder outputs six delayed video signals to a video server. The video server outputs a single delayed signal to a computer.

16 Claims, 3 Drawing Sheets

VEHICLE RESERVE SECURITY SYSTEM

CROSS-REFERENCES TO RELATED APPLICATIONS

This application claims the benefit of U.S. Provisional Patent Application No. 60/647,998, filed Jan. 28, 2005, which is incorporated herein in its entirety.

BACKGROUND OF THE INVENTION

1. Field of the Invention

The present invention relates generally to vehicle security and more particularly, to a vehicle reserve security system, which provides a video recording of 360 degrees around the vehicle.

2. Description of the Prior Art

There are hundreds of security systems for protecting motor vehicles. Most security systems prevent a motor vehicle from being stolen, but do not provide video surveillance. An example of a vehicle video security system is patent application no. 2003/0041329 to Bassett, which discloses an automobile camera system. The automobile camera system employs a detection and imaging system, including a force and motion detector sensor system, a wireless Internet network interface and a digital/web camera network for capturing video and related audio data.

Further, there is always an interest in determining how a motor vehicle accident occurred and who is at fault for the accident. Without a video record of the accident, law enforcement is forced into spending many hours of reconstructing accident scenes. There is no guarantee that their reconstruction is correct. Additionally, many people who travel would like to record their trip. However, no traveler would be able to get a 360 degree view of their trip with one video camera.

Accordingly, there is an established need for a vehicle reserve security system, which acts as security from theft, may be used to show the cause of a motor vehicle accident and may be used to record a road trip.

SUMMARY OF THE INVENTION

The invention is directed to a vehicle security and more particularly, to a vehicle reserve security system, which provides a video recording of 360 degrees around the vehicle.

In one general aspect of the present invention, the vehicle reserve security system includes a front view camera that is mounted to either an inside rear view mirror or a dashboard of the vehicle.

In another aspect of the present invention, the vehicle reserve security system includes a front left side camera that is mounted to a left outside rear view mirror of the vehicle or mounted inside the vehicle near a left window.

In a further aspect of the present invention, the vehicle reserve security system includes a front right side camera that is mounted to a right outside rear view mirror of the vehicle or mounted inside the vehicle near a right window of the vehicle.

In yet a further aspect of the present invention, the vehicle reserve security system includes a rear left side camera that is mounted inside the vehicle, near a rear left window.

In yet a further aspect of the present invention, the vehicle reserve security system includes a rear right side camera that is mounted inside the vehicle, near a rear right window.

In yet a further aspect of the present invention, the vehicle reserve security system includes a rear view camera that is mounted inside the vehicle on a deck below the rear window.

In yet a further aspect of the present invention, the vehicle reserve security system includes a digital video recorder, which receives video input from the six cameras and outputs six delayed video signals.

In yet a further aspect of the present invention, the vehicle reserve security system includes a video server, which receives the six delayed video signals and outputs a single delayed video signal that includes all six delayed video signals simultaneously.

In yet a further aspect of the present invention, the vehicle reserve security system includes a wireless modem, which receives the single delayed video signal and transmits thereof to a second wireless modem connected to a remote computer.

In yet a further aspect of the present invention, the vehicle reserve security system includes a beeper based transmitter/receiver system, so that a user can activate/de-activate the recording from anywhere through a cell phone.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE PREFERRED EMBODIMENTS

Figure 1:
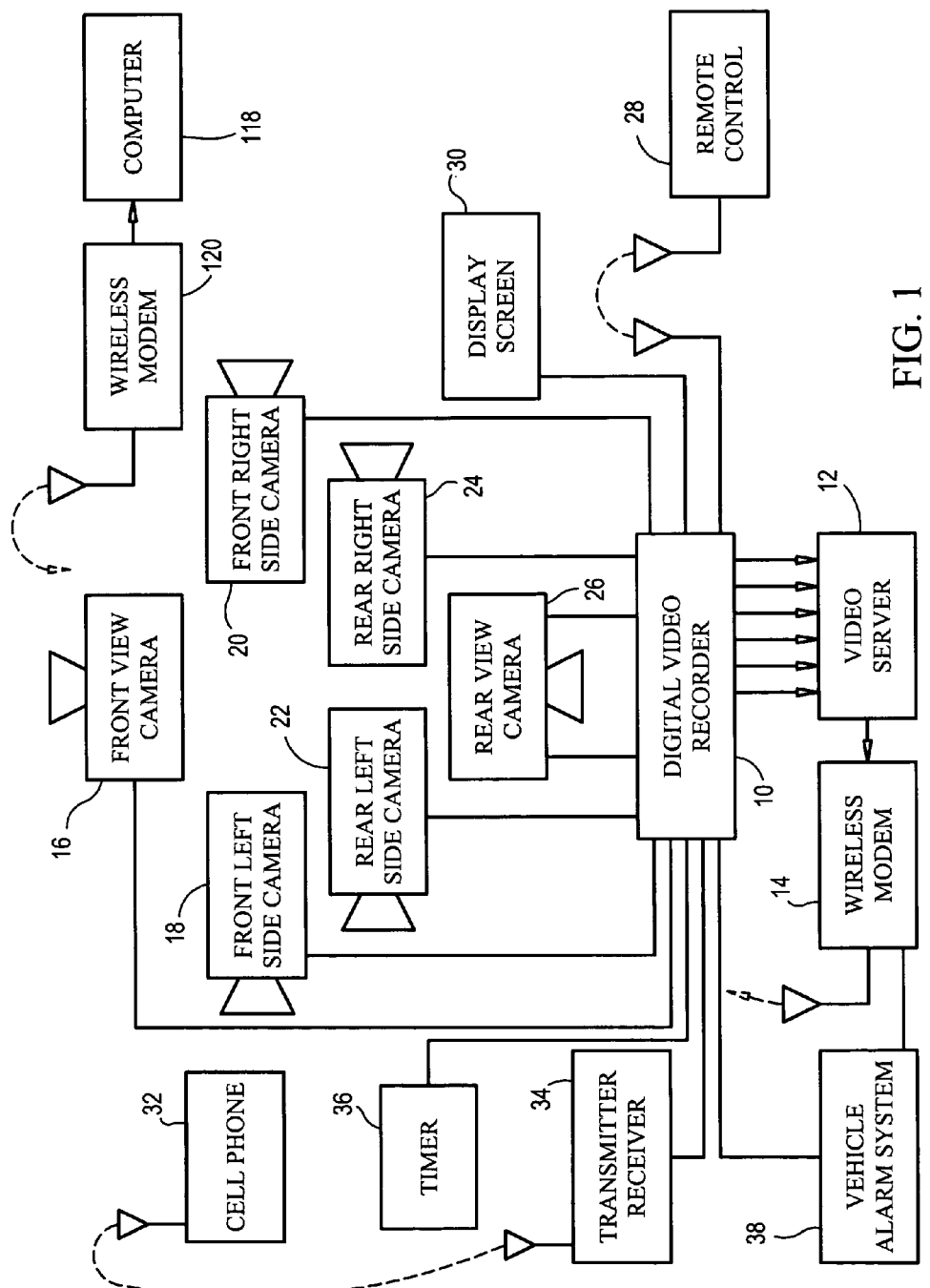
FIG. 1 is a schematic diagram of a vehicle reserve security system.
Figure 2:
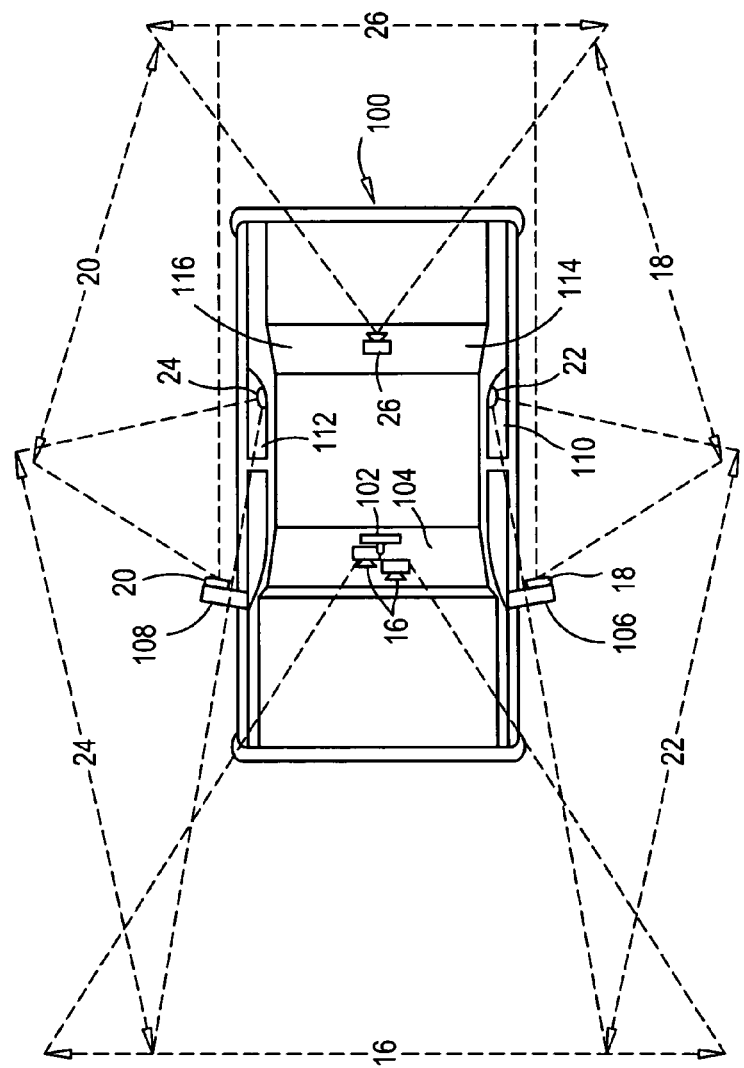
FIG. 2 is a top view of a vehicle with a plurality of cameras installed of a vehicle reserve security system.
Figure 3:
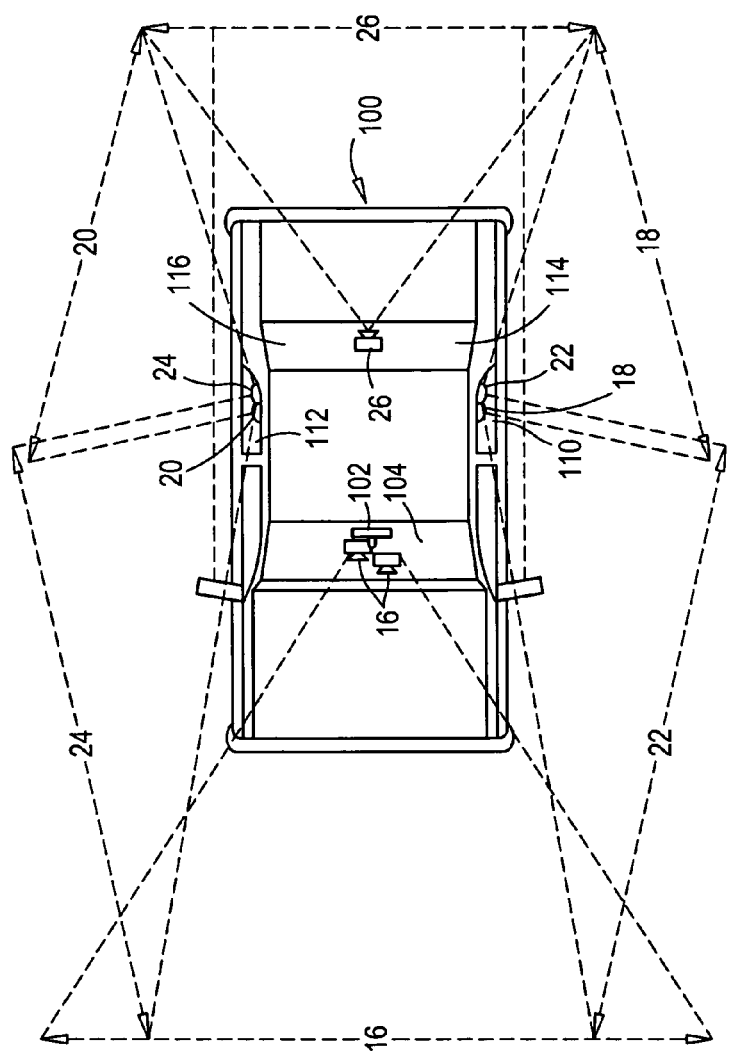
FIG. 3 is a top view of a vehicle with a plurality of cameras installed of a vehicle reserve security system.

Shown throughout the figures, the present invention is generally directed to a vehicle reserve security system 1. Referring briefly to FIGS. 1-3, the vehicle reserve security system 1 includes a plurality of cameras, a digital video recorder 10, a video server 12 and a wireless modem 14. A front view camera 16 is attached to an inside rear view mirror 102 or a dashboard 104 of a motor vehicle 100. The front view camera 16 views an area in front of the motor vehicle 100.

A front left side camera 18 is preferably attached to a bottom of a left side rear view mirror 106. The front left side camera 18 views an area behind the motor vehicle 100 and to a left thereof. However, the front left side camera 18 may also be located inside the vehicle 100 near a rear left side window 110 as shown in FIG. 3.

A front right side camera 20 is preferably attached to a bottom of a right side rear view mirror 108. The front right side camera views an area behind the motor vehicle 100 and to a right thereof. However, the front right side camera 20 may also be located inside the vehicle 100 near a rear right side window 112 as shown in FIG. 3.

A rear left side camera 22 is mounted inside the motor vehicle 100, near a rear left side window 110. The rear left side camera 22 views an area in front of the motor vehicle 100 and to a left thereof. The rear left side camera 22 and the front left side camera 18 may be mounted together in the same housing as shown in FIG. 3. A rear right side camera 24 is mounted inside the motor vehicle 100, near a rear right side } window 112. The rear right side camera 24 views an area in front of the motor vehicle 100 and to a right thereof. The rear right side camera 24 and the front right side camera 20 may be mounted together in the same housing as shown in FIG. 3. A rear view camera 26 is mounted on a deck 114 below a rear window 116. The rear view camera 26 views an area to a rear of the motor vehicle 100. However, a single left side camera may replace the front and rear left side cameras and a single right side camera may replace the front and rear right side cameras.

The front view camera 16 is preferably a pan and tilt camera with 480 lines of resolution, but other camera types with different resolutions may also be used. The front left side camera 18 and the front right side camera are preferably a Yoko night vision with 380 lines of resolution, but other camera types with different resolutions may also be used. The rear left side camera 22, the rear right side camera 24 and the rear view camera 26 are preferably either the pan and tilt camera with 480 lines of resolution or the Yoko night vision with 380 lines of resolution, but other camera types with different resolutions may also be used.

The output of the cameras 16, 18, 20, 22, 24, 26 are input into the digital video recorder 10. The digital video recorder 10 is preferably a Panasonic WJ-HD200 with up to eight inputs, but other digital video recorders may also be used. The digital video recorder 10 records the video feeds of all six cameras and then outputs a delayed video signal for each of the six cameras. A remote control 28 is preferably connected to the digital video recorder 10 for remote operation thereof. A display screen 30 is preferably connected to the digital video recorder for displaying a real time or delayed image seen through the plurality of cameras. The digital video recorder and cameras are preferably capable of being activated or deactivated by a cell phone 32 through a beeper based transmitter receiver 34. The digital video recorder and cameras are also preferably capable of being deactivated through a timer 36.

The delayed video signal from the six cameras is input by the video server 12. The video server 12 takes the six individual delayed video signals and combines them into a single delayed signal. The video server 12 is preferably a StarDot Technologies Express 6, but other video servers may also be used. The single delayed signal is output to a wireless modem 14. A vehicle alarm system 38 is preferably connected to an output of the digital video recorder 10. An output from the vehicle alarm system 38 may be connected to an input of the wireless modem 14. The wireless modem 14 transmits a wireless delayed signal to a wireless computer modem 120, which is connected to a remotely located computer 118. The computer 118 records the wireless delayed signal on a hard drive for review at a later time or for nearly real time viewing. However, the computer 118 may also be located in the motor vehicle 100. If the computer 118 were located in the motor vehicle 100, the video server 12 would be directly connected to the computer 118. It should be noted that, if desired the system may be connected to the speedometer (not shown) to record the speed of the vehicle, as well.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A vehicle reserve security system, comprising:
   a front left side camera having a rearward and leftward view from a left side of the motor vehicle;
   a rear left side camera having a frontward and leftward view from said left side of the motor vehicle, said rear left side camera being mounted in a rearward position relative to said front left side camera, said view of said rear left side camera overlapping said view of said front left side camera;
   a front right side camera having a rearward and rightward view from a right side of the motor vehicle;
   a rear right side camera having a frontward and rightward view from said right side of the motor vehicle, said rear right side camera being mounted in a rearward position relative to said front right side camera, said view of said rear right side camera overlapping said view of said front right side camera;
   a front view camera having an unobstructed view forward from the motor vehicle, said view of said front view camera overlapping said views of said rear left side camera and said rear right side camera;
   a rear view camera having an unobstructed view rearward from the motor vehicle, said view of said rear view camera overlapping said views of said front left side camera and said front right side camera,
   the front view camera, the front left side camera, the rear left side camera, the front right side camera, the rear right side camera and the rear view camera collectively obtaining a view completely surrounding an exterior of the motor vehicle;
   a digital video recorder receiving a respective input from each camera, said digital video recorder outputting six delayed video signals; and
   a video server receiving said six delayed video signals and outputting a single delayed video signal.

2. The vehicle reserve security system of claim 1, further comprising:
   a wireless modem being in wired communication with said video server, said wireless modem transmitting said single delayed video signal.

3. The vehicle reserve security system of claim 2, further comprising:
   a computer wireless modem being connected to a computer, said computer wireless modem receiving said single delayed video signal.

4. The vehicle reserve security system of claim 1, wherein:
   said digital video recorder and said cameras are activated or deactivated by a cell phone through a receiver/transmitter.

5. The vehicle reserve security system of claim 1, further comprising:
   a display screen being connected to said digital video recorder for displaying a real time or delayed image seen through said cameras.

6. The vehicle reserve security system of claim 1, further comprising:
   a timer for deactivating said digital video recorder and said cameras.

7. A vehicle reserve security system, comprising:
   a front left side camera, mounted to one of a left side rear view mirror and near a left side window of the motor vehicle, the front left side camera having a rearward and leftward view from a left side of the motor vehicle;
   a rear left side camera, mounted to an area of the vehicle proximate a left side window of the motor vehicle, the rear left side camera having a forward and leftward view from a left side of the motor vehicle, said rear left side camera being mounted in a rearward position relative to said front left side camera, said view of said rear left side camera overlapping said view of said front left side camera;

a front right side camera, mounted to one of a right side rear view mirror and near a right side window of the motor vehicle, the front right side camera having a rearward and rightward view from a right side of the motor vehicle;

a rear right side camera, mounted to an area of the vehicle proximate a right side window of the motor vehicle, the rear right side camera having a forward and rightward view from a right side of the motor vehicle, said rear right side camera being mounted in a rearward position relative to said front right side camera, said view of said rear right side camera overlapping said view of said front right side camera;

a front view camera having an unobstructed view forward from the motor vehicle, said view of said front view camera overlapping said views of said rear left side camera and said rear right side camera;

a rear view camera having an unobstructed view rearward from the motor vehicle, said view of said rear view camera overlapping said views of said front left side camera and said front right side camera, the front view camera, the front left side camera, the rear left side camera, the front right side camera, the rear right side camera, and the rear view camera collectively obtaining a view completely surrounding an exterior of the motor vehicle;

a digital video recorder receiving a respective input from each camera, said digital video recorder outputting six delayed video signals; and a video server receiving said six delayed video signals and outputting a single delayed video signal.

8. The vehicle reserve security system of claim 7, further comprising:

a wireless modem being in wired communication with said video server, said wireless modem transmitting said single delayed video signal; and a computer wireless modem being connected to a computer, said computer wireless modem receiving said single delayed video signal.

9. The vehicle reserve security system of claim 7, further comprising:

said digital video recorder and said cameras being activated or deactivated by a cell phone through a receiver/transmitter.

10. The vehicle reserve security system of claim 7, further comprising:

a display screen being connected to said digital video recorder for displaying a real time or delayed image seen through said cameras.

11. The vehicle reserve security system of claim 7, further comprising:

a timer for deactivating said digital video recorder and said cameras.

12. A vehicle reserve security system, comprising:

a front left side camera, mounted to one of a left side exterior mirror and near a left side window of the motor vehicle, the front left side camera having a rearward and leftward view from a left side of the motor vehicle;

a rear left side camera, mounted proximate a left side window of the motor vehicle, the rear left side camera having a forward and leftward view from a left side of the motor vehicle, said rear left side camera being mounted in a rearward position relative to said front left side camera, said view of said rear left side camera overlapping said view of said front left side camera, the front left side camera and rear left side camera combined having an unobstructed view from a left side of the motor vehicle;

a front right side camera, mounted to one of a right side rear view mirror and near a right side window of the motor vehicle, the front right side camera having a rearward and rightward view from a right side of the motor vehicle;

a rear right side camera, mounted proximate a right side window of the motor vehicle, the rear right side camera having a forward and rightward view from a right side of the motor vehicle, said rear right side camera being mounted in a rearward position relative to said front right side camera, said view of said rear right side camera overlapping said view of said front right side camera, the front right side camera and rear right side camera combined having an unobstructed view from a right side of the motor vehicle;

a front view camera, attached to one of an interior rear view mirror and a dashboard of a motor vehicle, the front view camera having an unobstructed view forward from the motor vehicle, said view of said front view camera overlapping said views of said rear left side camera and said rear right side camera;

a rear view camera, mounted on an interior deck below a rear window of the motor vehicle, the rear view camera having an unobstructed view rearward from the motor vehicle, wherein the interior deck is a panel located within an area extending between a rear seat of the motor vehicle and a lower edge of the rear window of the motor vehicle and longitudinally between a left side of the motor vehicle and a right side of the motor vehicle, said view of said rear view camera overlapping said views of said front left side camera and said front right side camera, the front view camera, the front left side camera, the rear left side camera, the front right side camera, the rear right side camera, and the rear view camera collectively obtaining a view completely surrounding an exterior of the motor vehicle;

a digital video recorder receiving an input from said front view, front left side, rear left side, front right side, rear right side and rear view cameras, said digital video recorder outputting six delayed video signals; and a video server receiving said six delayed video signals and outputting a single delayed video signal.

13. The vehicle reserve security system of claim 12, further comprising:

a wireless modem being in wired communication with said video server, said wireless modem transmitting said single delayed video signal.

14. The vehicle reserve security system of claim 13, further comprising:

a computer wireless modem being connected to a computer, said computer wireless modem receiving said single delayed video signal.

15. The vehicle reserve security system of claim 12, wherein:

said digital video recorder and said cameras are activated or deactivated by a cell phone through a receiver/transmitter.

16. The vehicle reserve security system of claim 12, further comprising:
 a display screen being connected to said digital video recorder for displaying a real time or delayed image seen through said cameras.

\* \* \* \* \*